(12) United States Patent
Hsieh et al.

(10) Patent No.: US 10,472,023 B2
(45) Date of Patent: Nov. 12, 2019

(54) EYE PLATE UNIT AND LASHING EYE ASSEMBLY INCLUDING THE SAME

(71) Applicants: Jung-Kuang Hsieh, Taichung (TW); Oscar Magnus Ahlström, Halmstad (SE)

(72) Inventors: Jung-Kuang Hsieh, Taichung (TW); Oscar Magnus Ahlström, Halmstad (SE)

(*) Notice: Subject to any disclaimer, the term of this patent is extended or adjusted under 35 U.S.C. 154(b) by 0 days.

(21) Appl. No.: 15/948,372

(22) Filed: Apr. 9, 2018

(65) Prior Publication Data

US 2019/0112010 A1   Apr. 18, 2019

(30) Foreign Application Priority Data

Oct. 13, 2017   (TW) ............... 106135152 A

(51) Int. Cl.
  *B63B 25/28* (2006.01)
  *B63B 25/00* (2006.01)
  *F16M 13/02* (2006.01)

(52) U.S. Cl.
  CPC ............ *B63B 25/28* (2013.01); *B63B 25/004* (2013.01); *F16M 13/02* (2013.01); *B63B 2025/285* (2013.01)

(58) Field of Classification Search
  CPC .. B63B 25/28; B63B 25/004; B63B 2025/285
  USPC .......... 410/68, 77, 96, 97, 100; 114/75; 24/265 CD; 248/499
  See application file for complete search history.

(56) References Cited

U.S. PATENT DOCUMENTS

| 7,101,130 | B2 | 9/2006 | Hsieh |
| 7,422,400 | B2 | 9/2008 | Hsieh |
| 7,575,403 | B2 | 8/2009 | Hsieh |
| 9,499,237 | B1 | 11/2016 | Hsieh |

FOREIGN PATENT DOCUMENTS

| DE | 4033704 A1 * | 4/1992 | ............ B60P 7/13 |
| DE | 202017103865 U1 | 7/2017 | |

* cited by examiner

*Primary Examiner* — Hilary L Gutman
(74) *Attorney, Agent, or Firm* — Osha Liang LLP

(57) ABSTRACT

A lashing eye assembly includes a mounting unit and an eye plate unit which includes two wing members and a bridge member. The wing members are angularly displaced from each other about an axle axis. Each of the wing members has a rim portion and a body portion which is formed with a lashing eye configured to couple a lower end of a lashing rod assembly. The bridge member has an outer interconnecting surface interconnecting outward regions of the rim portions of the wing members, and an inner interconnecting surface which extends in a circumferential direction about the axle axis to interconnect inward regions of the rim portions of the wing members.

13 Claims, 15 Drawing Sheets

EYE PLATE UNIT AND LASHING EYE ASSEMBLY INCLUDING THE SAME

CROSS-REFERENCE TO RELATED APPLICATION

This application claims priority from Taiwanese invention patent application no. 106135152, filed on Oct. 13, 2017.

FIELD

The disclosure relates to an eye plate unit for shipping containers, more particularly to a lashing eye assembly including the eye plate unit.

BACKGROUND

Generally, when containers are being transported in a cargo vessel or ship, the containers are stacked on the deck of the ship and secured by lashing rod assemblies in order to prevent undesired movement or toppling down of the stacked containers. The inventor of this application has proposed several such lashing rod assemblies, such as those disclosed in U.S. Pat. Nos. 7,101,130B2, 7,422,400B2, 7,575,403B2, 9,499,237B1, etc.

As shown in FIGS. 1 and 2, each of the lashing rod assemblies 3 has an upper end 501 coupled to a corner casting 601 of a shipping container 6, and a lower end 401 coupled to a conventional eye plate 1 mounted to a platform 200 on a mounting post 2. The mounting post 2 may be secured on the deck or a lashing bridge on the desk. The eye plate 1 has a plurality of mounting holes 101. Normally, each of the lashing rod assemblies 3 includes a turnbuckle 4 and a lashing rod 5. The turnbuckle 4 has an upper segment 44 and a lower segment 45 which are movable relative to each other and which can be secured to each other so as to tighten the lashing rod 5. The lashing rod 5 has an upper end which serves as the upper end 501 of the respective lashing rod assembly 3, and a lower end segment 502 coupled to the upper segment 44 of the turnbuckle 4. The lower segment 45 of the turnbuckle 4 has two lugs 451 each having a lug hole. In the lower end 401 of the lashing rod assembly 3, a pin 43 extends through the respective mounting hole 101 and has two opposite ends which extend respectively through the lug holes and which are secured respectively to the lugs 451 to thereby couple the lower segment 45 of the turnbuckle 4 to the eye plate 1.

In FIG. 3, the shipping containers 6 and the lashing rod assemblies 3 on the ship are shown by solid lines. When the ship is subjected to an impact shown by an arrow (F), the shipping containers 6, as shown by dashed lines, are likely tilted in an opposite direction. In this case, because the eye plate 1 are non-movably mounted to the mounting post 2, the tilting movement of the shipping containers 6 may cause fracture of the shipping containers 6 or the lashing rod assemblies 3 (see also FIG. 4).

In addition, because the turnbuckle 4 may be undesirably turned relative to the conventional eye plate 1, the distance between two adjacent turnbuckles 4 may be greatly varied during tightening or untightening of the lashing rod assemblies 3, and thus to cause harm and injury to an operator.

DE 20 2017 0103 865 U1 also discloses a lasing rod assembly.

SUMMARY

Therefore, an object of the disclosure is to provide a novel eye plate unit and a lashing eye assembly including the same.

According to a first aspect of the disclosure, an eye plate unit for anchoring a pair of lashing rod assemblies on a mounting unit is provided. Each of the lashing rod assemblies has an upper end coupled to a corner casting of a shipping container, and a lower end opposite to the upper end in a lengthwise direction of the respective lashing rod assembly. The mounting unit includes a base mounted on a platform, a first lug member, a second lug member, and a pin axle. Each of the first and second lug members extends from an upper major surface of the base, and has an inside surface and an outside surface opposite to the inside surface in a direction of an axle axis. The inside surfaces of the first and second lug members are spaced apart from each other in the direction of the axle axis. The pin axle extends along the axle axis, and is interposed between the inside surfaces of the first and second lug members. The eye plate unit includes a first wing member, a second wing member, and a bridge member. The first and second wing members are angularly displaced from each other about the axle axis. Each of the first and second wing members has a body portion and a rim portion. The body portion is formed with a lashing eye which defines a central line, and is configured to couple the lower end of a corresponding one of the lashing rod assemblies. The rim portion extends about the central line, and has an inward region, an outward region, and a juncture region interconnecting the inward and outward regions. The bridge member is disposed between the first and second lug members, and extends to interconnect the juncture regions of the first and second wing members. The bridge member has an outer arcuate surface and an inner arcuate surface. The outer arcuate surface interconnects the outward regions of the first and second wing members. The inner arcuate surface extends in a circumferential direction about the axle axis to interconnect the inward regions of the first and second wing members, and is configured for the pin axle to bear on the inner arcuate surface such that the inward regions of the first and second wing members are spaced apart from each other by a gap, thereby permitting the first and second wing members to be yieldable in the circumferential direction to a jerking force exerted on the lashing eyes of the first and second wing members through the lashing rod assemblies as a result of a tilting movement of the shipping container.

According to a second aspect of the disclosure, a lashing eye assembly for anchoring a pair of lashing rod assemblies on a platform is provided. Each of the lashing rod assemblies has an upper end coupled to a corner casting of a shipping container, and a lower end opposite to the upper end in a lengthwise direction of the respective lashing rod assembly. The lasing eye assembly includes a mounting unit and an eye plate unit. The mounting unit includes a base mounted on the platform, a first lug member, a second lug member, and a pin axle. Each of the first and second lug members extends from an upper major surface of the base, and has an inside surface and an outside surface opposite to the inside surface in a direction of an axle axis. The inside surfaces of the first and second lug members are spaced apart from each other in the direction of the axle axis. The pin axle extends along the axle axis, and is interposed between the inside surfaces of the first and second lug members. The eye plate unit includes a first wing member, a second wing member, and a bridge member. The first and second wing members are angularly displaced from each other about the axle axis. Each of the first and second wing members has a body portion and a rim portion. The body portion is formed with a lashing eye which defines a central line, and which is configured to couple the lower end of a corresponding one of the lashing rod assemblies. The rim portion extends about the central line, and has an inward region, an outward region, and a juncture region interconnecting the inward and outward regions. The bridge member is disposed between the first and second lug members, and extends to interconnect the juncture regions of the first and second wing members. The bridge member has an outer arcuate surface and an inner arcuate surface. The outer arcuate surface interconnects the outward regions of the first and second wing members. The inner arcuate surface extends in a circumferential direction about the axle axis to interconnect the inward regions of the first and second wing members, and is configured to permit the pin axle to bear on the inner arcuate surface such that the inward regions of the first and second wing members are spaced apart from each other by a gap, thereby permitting the first and second wing members to be yieldable in the circumferential direction to a jerking force exerted on the lashing eyes of the first and second wing members through the lashing rod assemblies as a result of a tilting movement of the shipping container.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
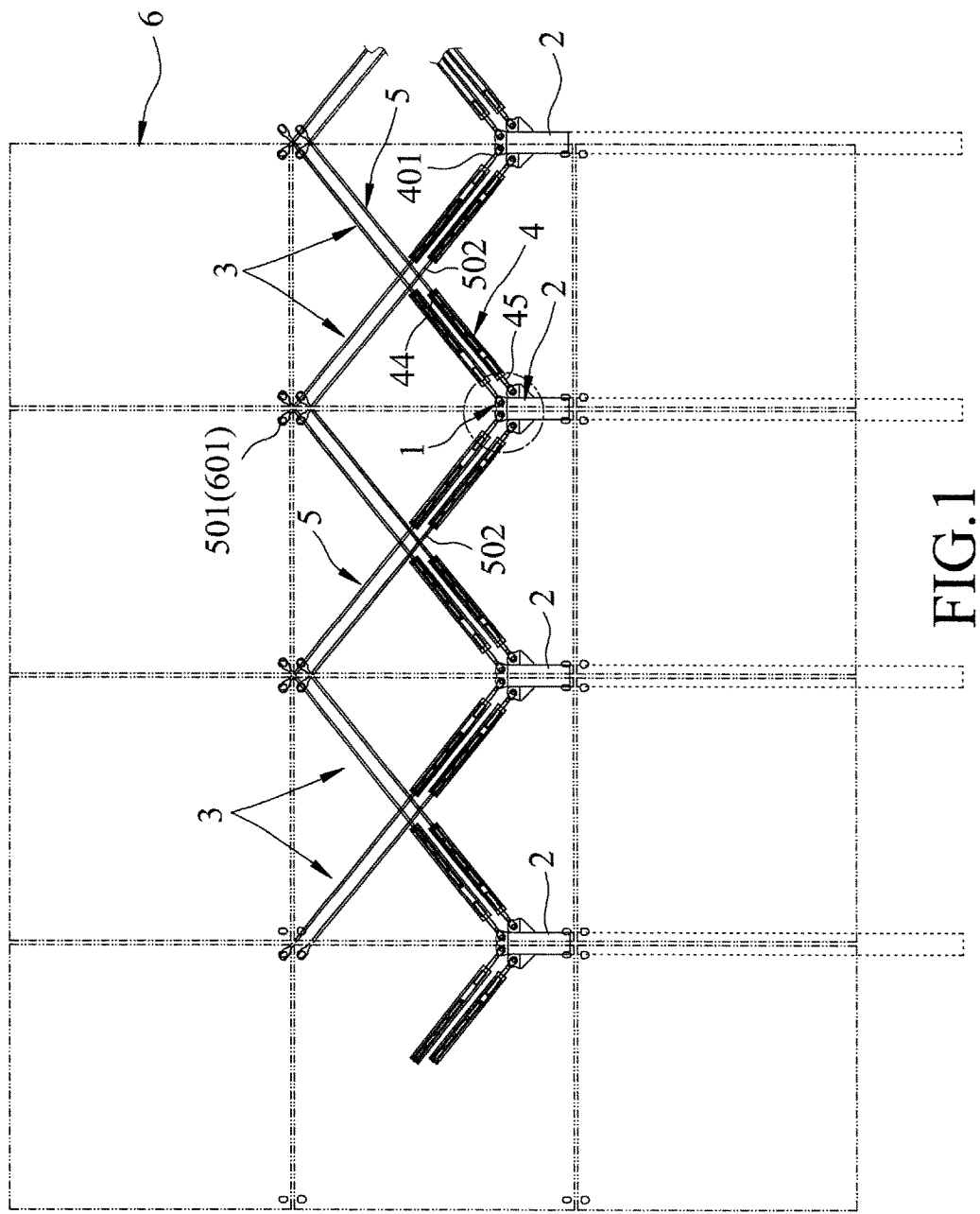
FIG. 1 is a schematic view illustrating a plurality of lashing rod assemblies for fastening shipping containers to a plurality of mounting posts through a plurality of conventional eye plates.
Figure 2:
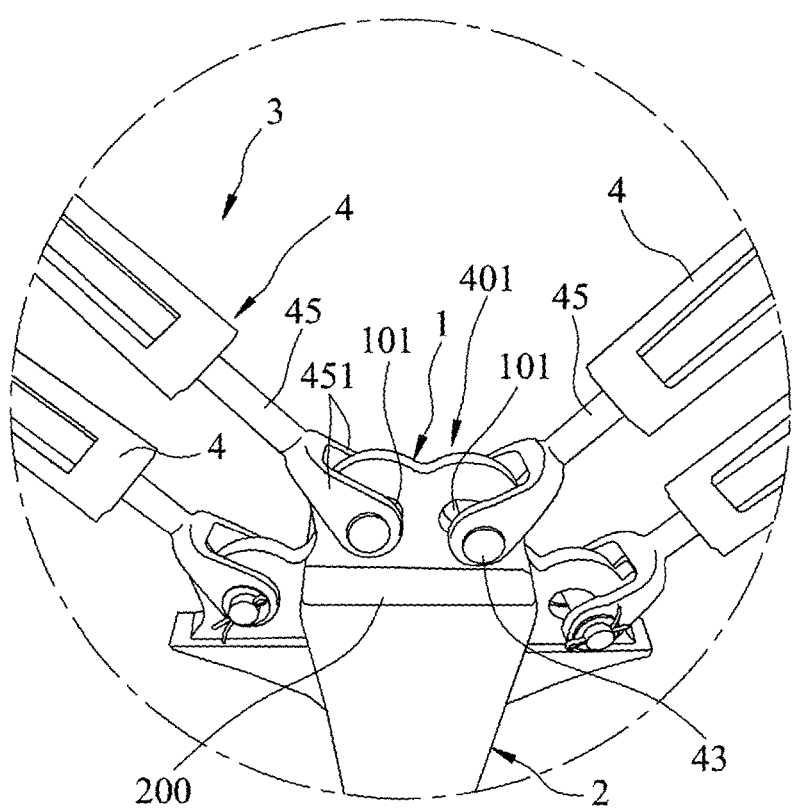
FIG. 2 is a fragmentary partially enlarged view of the conventional eye plates of FIG. 1.
Figure 3:
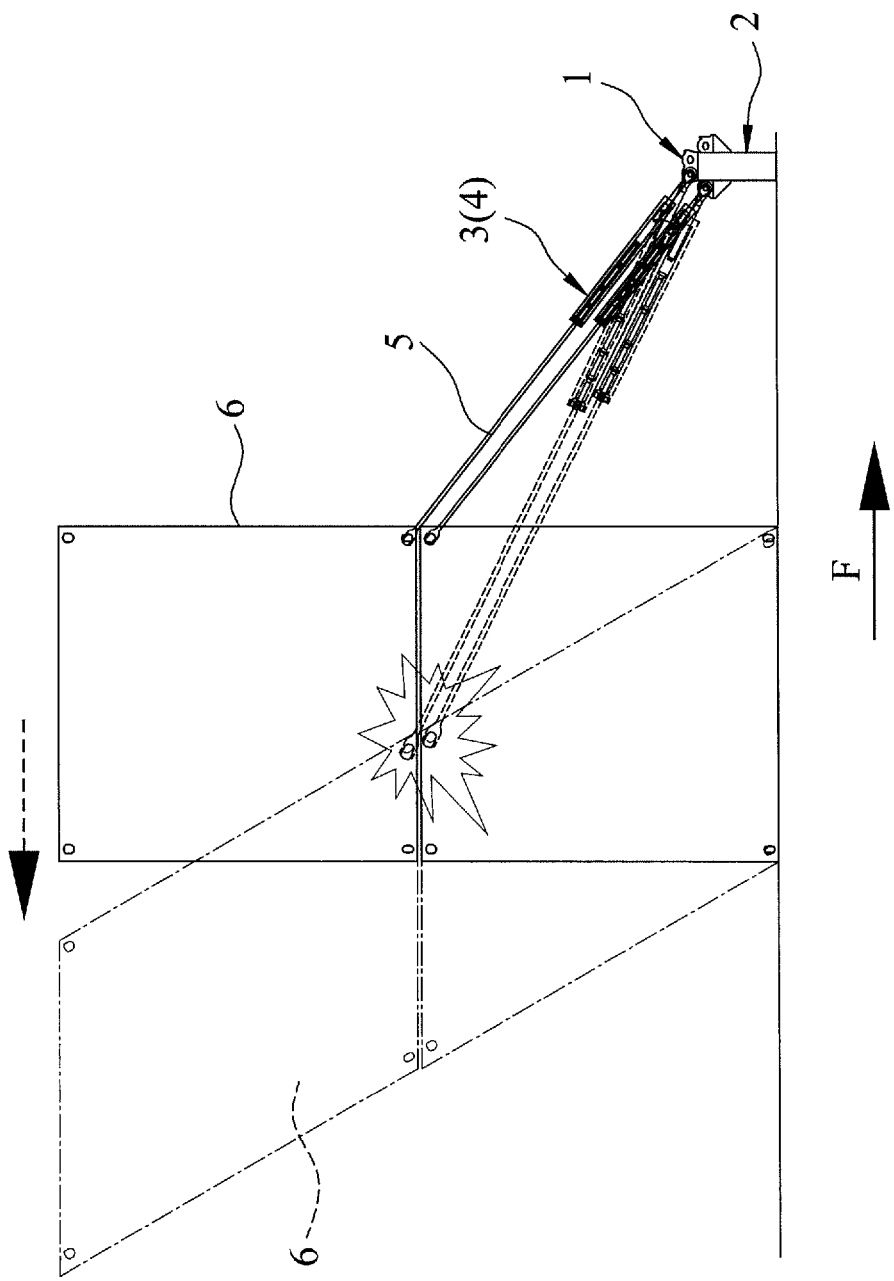
FIG. 3 is a schematic view illustrating a tilting movement of the shipping containers.
Figure 4:
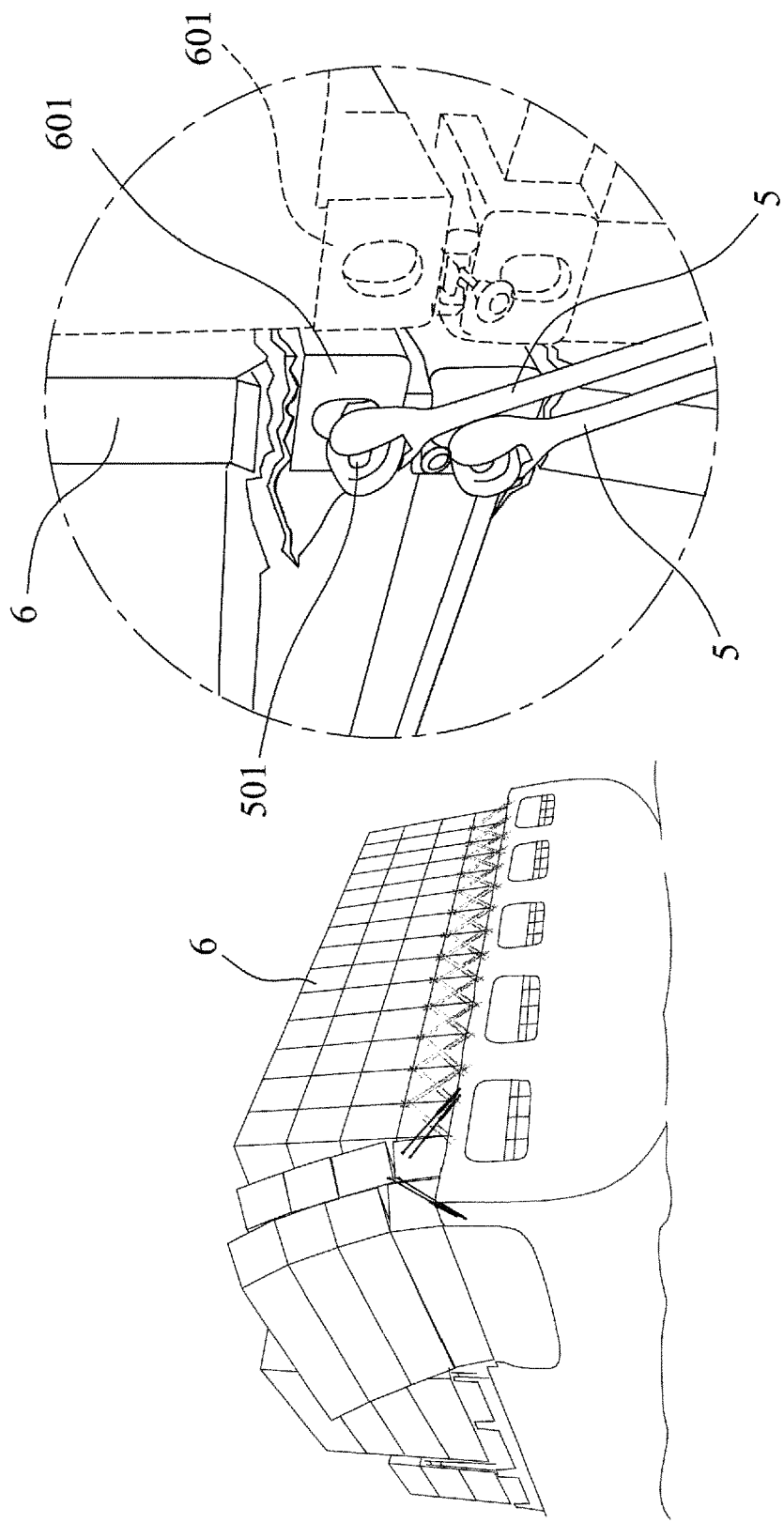
FIG. 4 is a schematic view illustrating the tilting movement of the shipping containers on a ship and fracture of the shipping containers.

Before the disclosure is described in greater detail, it should be noted that where considered appropriate, reference numerals have been repeated among the figures to indicate corresponding or analogous elements, which may optionally have similar characteristics.

Figure 5:
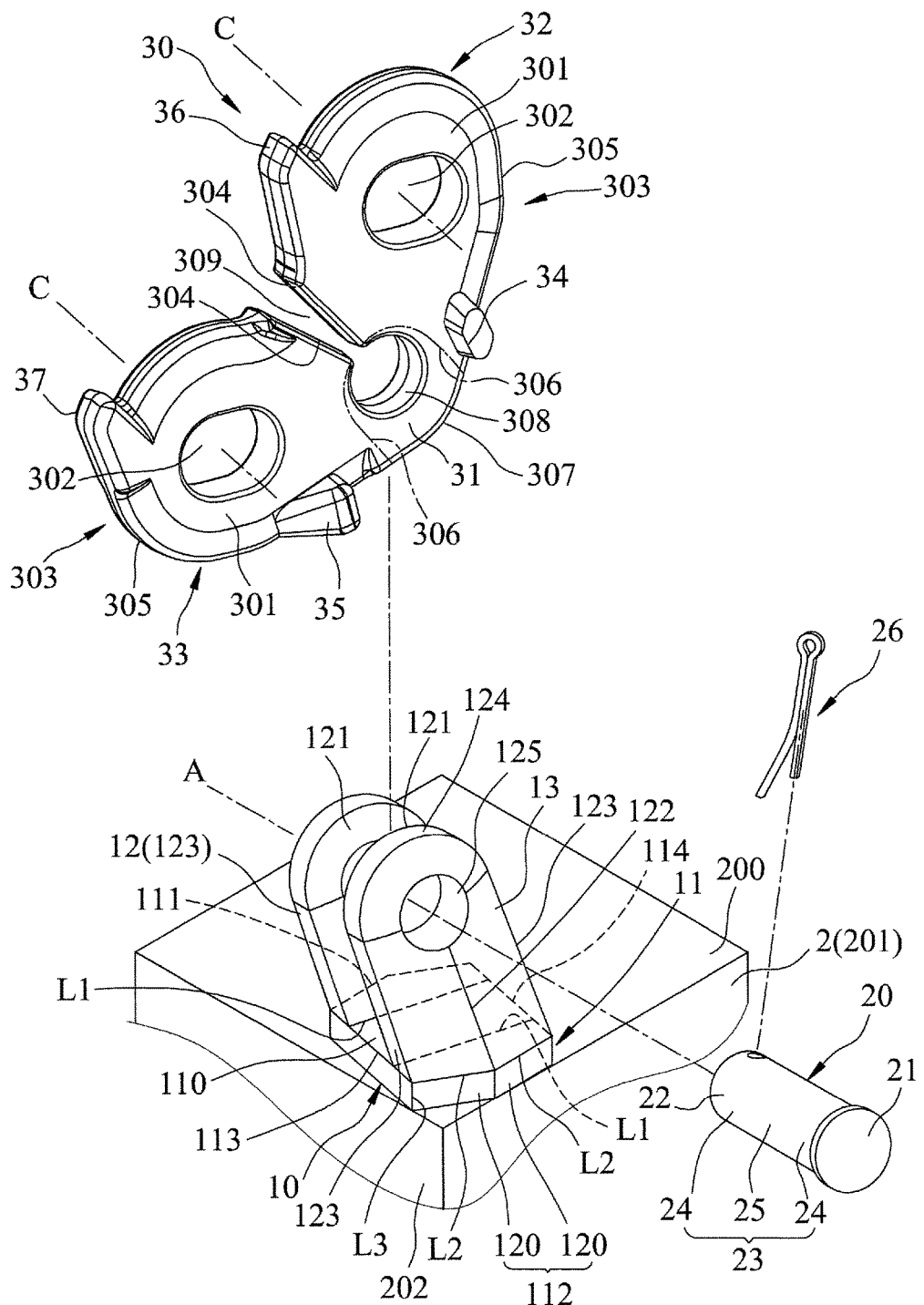
FIG. 5 is an exploded perspective view of a lashing eye assembly according to a first embodiment of the disclosure.
Figure 9:
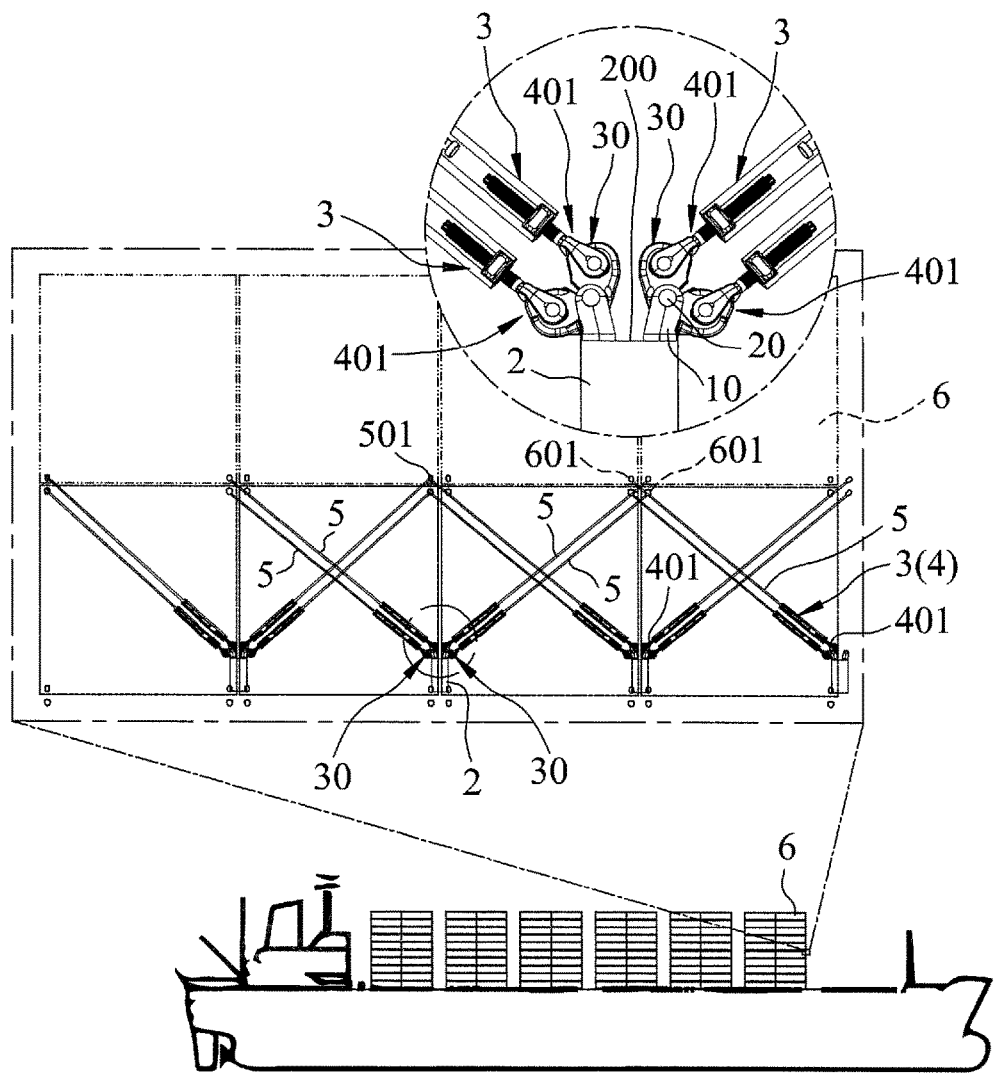
FIG. 9 is a schematic view illustrating lower ends of lashing rod assemblies are respectively coupled to a plurality of the lashing eye assemblies shown in FIG. 6.

Referring to FIGS. 5 and 9, a lashing eye assembly according to a first embodiment of the disclosure is provided for anchoring a pair of lashing rod assemblies 3 on a platform 200 of a mounting post 2. Each of the lashing rod assemblies 3 has an upper end 501 coupled to a corner casting 601 of a shipping container 6, and a lower end 401 opposite to the upper end 501 in a lengthwise direction of the respective lashing rod assembly 3. The lashing eye assembly includes a mounting unit 10 and an eye plate unit 30. Each of the lashing rod assemblies 3 is similar to those described hereinabove in reference to FIGS. 1 to 4.

The mounting unit 10 includes a base 11, a first lug member 12, a second lug member 13, and a pin axle 25.

The base 11 is mounted on the platform 200. In this embodiment, the base 11 has an upper major surface 110, a first minor surface 111 a second minor surface 112, a third minor surface 113, and a fourth minor surface 114. The first and second minor surfaces 111, 112 are opposite to each other in a direction of an axle axis (A). The third and fourth minor surfaces 113, 114 are opposite to each other in a direction transverse to the axle axis (A). The second minor surface 112 has two flat surface regions 120 that form an obtuse angle. Each of the flat surface regions 120 defines a second juncture line (L2) together with the upper major surface 110 of the base 11.

Each of the first and second lug members 12, 13 extends from the upper major surface 110 of the base 11 to terminate at an end surface 124, and has an inside surface 121 and an outside surface 122 opposite to each other in the direction of the axle axis (A). The first and second lug members 12, 13 are disposed in proximity to the first and second minor surfaces 111, 112, respectively. The inside surfaces 121 of the first and second lug members 12, 13 are spaced apart from each other in the direction of the axle axis (A). In this embodiment, each of the first and second lug members 12, 13 has a lug hole 125 and two lateral surfaces 123. The lug hole 125 extends from the outside surface 122 to the inside surface 121. The lateral surfaces 123 are opposite to each other in the direction transverse to the axle axis (A). The inside surfaces 121 of the first and second lug members 12, 13 are parallel to each other. The upper major surface 110 of the base 11 and the inside surface 121 of each of the first and second lug members 12, 13 define a first juncture line (L1) therebetween.

Figure 7:
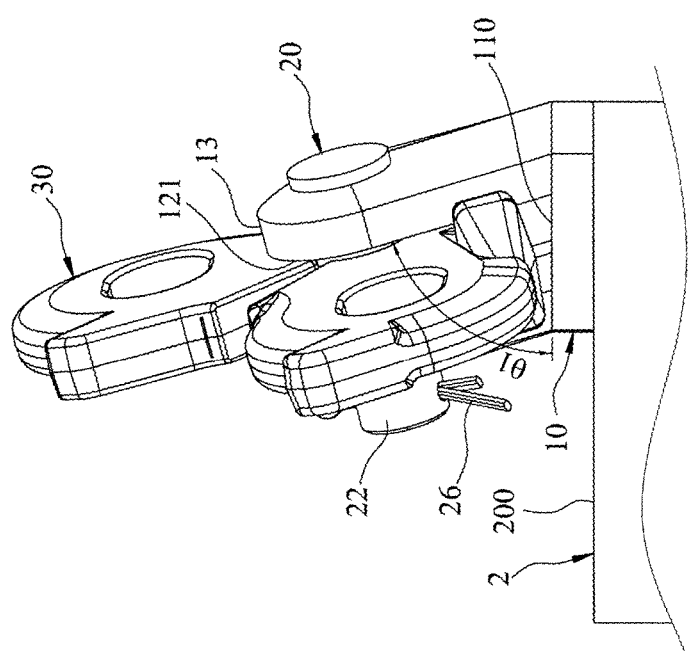
FIG. 7 is similar to FIG. 6 but illustrating the lashing eye assembly viewing from another side.
Figure 8:
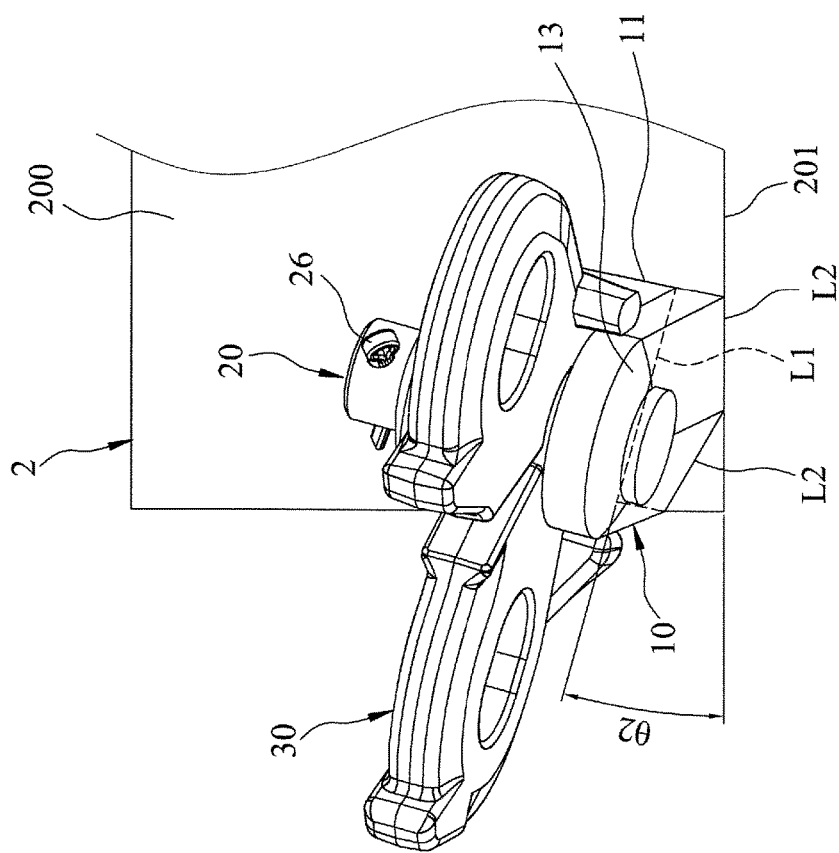
FIG. 8 is similar to FIG. 6 but illustrating the lashing eye assembly viewing from a top side.

In addition, as shown in FIGS. 7 and 8, a first included angle (θ1) between an upper major surface 110 of the base 11 and the inside surface 121 of the second lug member 13 ranges from 75° to 80°, and a second included angle (θ2) between the first and second juncture lines (L1, L2) ranging from 10° to 15°. In this embodiment, the first included angle (θ1) is 75° and the second included angle (θ2) is 15°.

The pin axle 25 extends along the axle axis (A), and interposed between the inside surfaces 121 of the first and second lug members 12, 13.

In this embodiment, the mounting unit 10 includes a tubular shaft 20 and a fastener 26. The tubular shaft 20 has an enlarged head 21, a shaft end 22 opposite to the enlarged head 21, and an intermediate segment 23. The enlarged head 21 has a dimension larger than the lug hole 125. The intermediate segment 23 is disposed between the enlarged head 21 and the shaft end 22, and has two retained regions 24 such that when the tubular shaft 20 is inserted through the lug holes 125 of the first and second lug members 12, 13 to leave the enlarged head 21 and said shaft end 22 outboard of the first and second lug members 12, 13, the retained regions 24 are respectively retained in the lug holes 125 of the first and second lug members 12, 13, so as to permit a remaining part 25 of the intermediate segment 23 between the retained regions 24 to serve as the pin axle 25.

Referring back to FIG. 5, it is shown that the eye plate unit 30 is in a plate form, and includes a bridge member 31, a first wing member 32, and a second wing member 33. The eye plate unit 30 is turnably mounted between the first and second lug members 12, 13.

The first and second wing members 32, 33 are angularly displaced from each other about the axle axis (A). Each of the first and second wing members 32, 33 has a body portion 301 and a rim portion 303.

The body portion 301 is formed with a lashing eye 302 which defines a central line (C), and which is configured to couple the lower end 401 of a corresponding one of the lashing rod assemblies 3 (see also FIG. 9). In this embodiment, the lashing eyes 302 of the first and second wing members 32, 33 are ellipse holes with major axes parallel to each other.

The rim portion 303 extends about the central line (C), and has an inward region 304, an outward region 305, and a juncture region 306 interconnecting the inward and outward regions 304, 305.

As shown in FIG. 5, the bridge member 31 is disposed between the first and second lug members 12, 13, and extends to interconnect the juncture regions 306 of the first and second wing members 32, 33. The bridge member 31 has an outer interconnecting surface 307 and an inner interconnecting surface 308.

The outer interconnecting surface 307 interconnects the outward regions 305 of the first and second wing members 32, 33. In an embodiment, the outer interconnecting surface is an arcuate surface.

Figure 10:
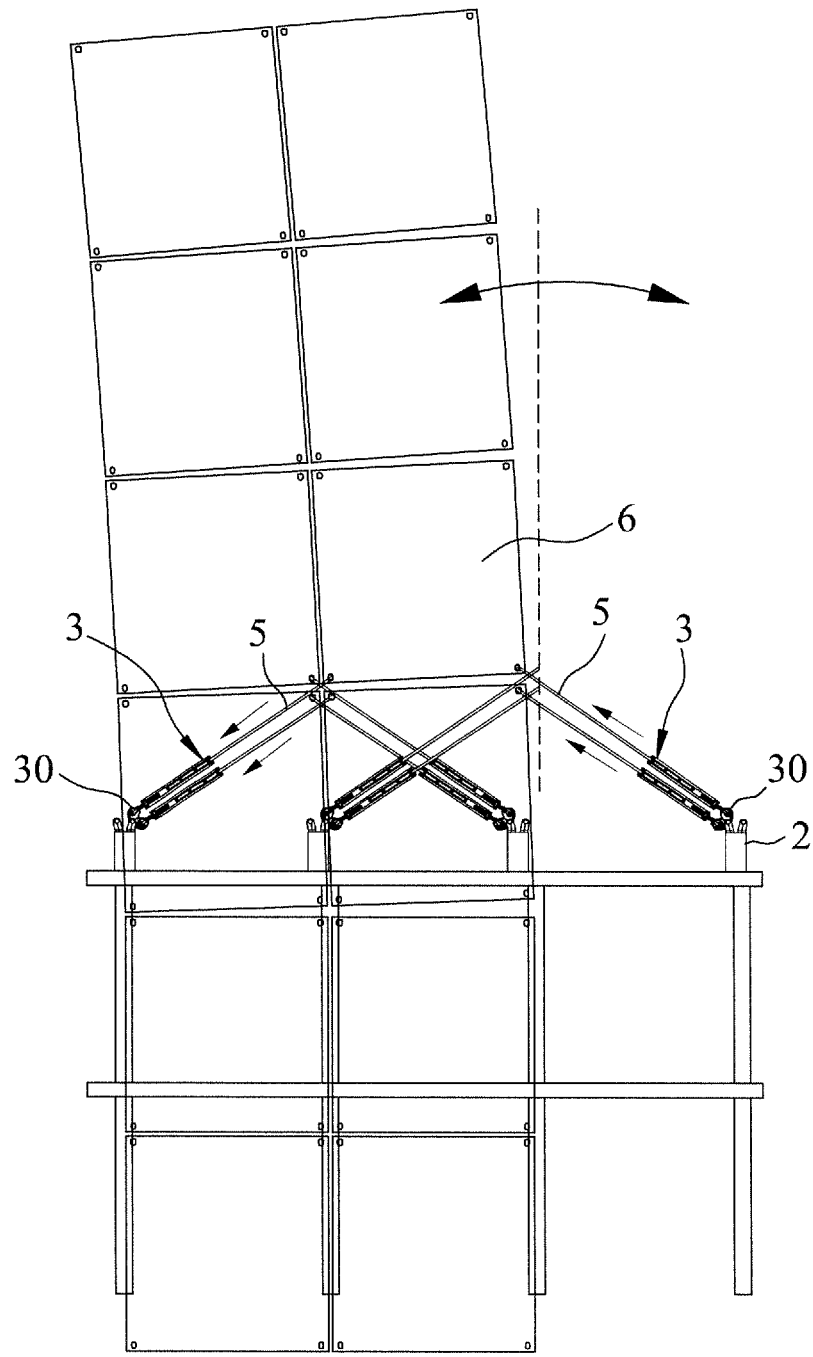
FIG. 10 is a schematic view illustrating a tilting movement of the shipping containers which are coupled to the lashing eye assemblies shown in FIG. 6 through a plurality of lashing rod assemblies 3.
Figure 11:
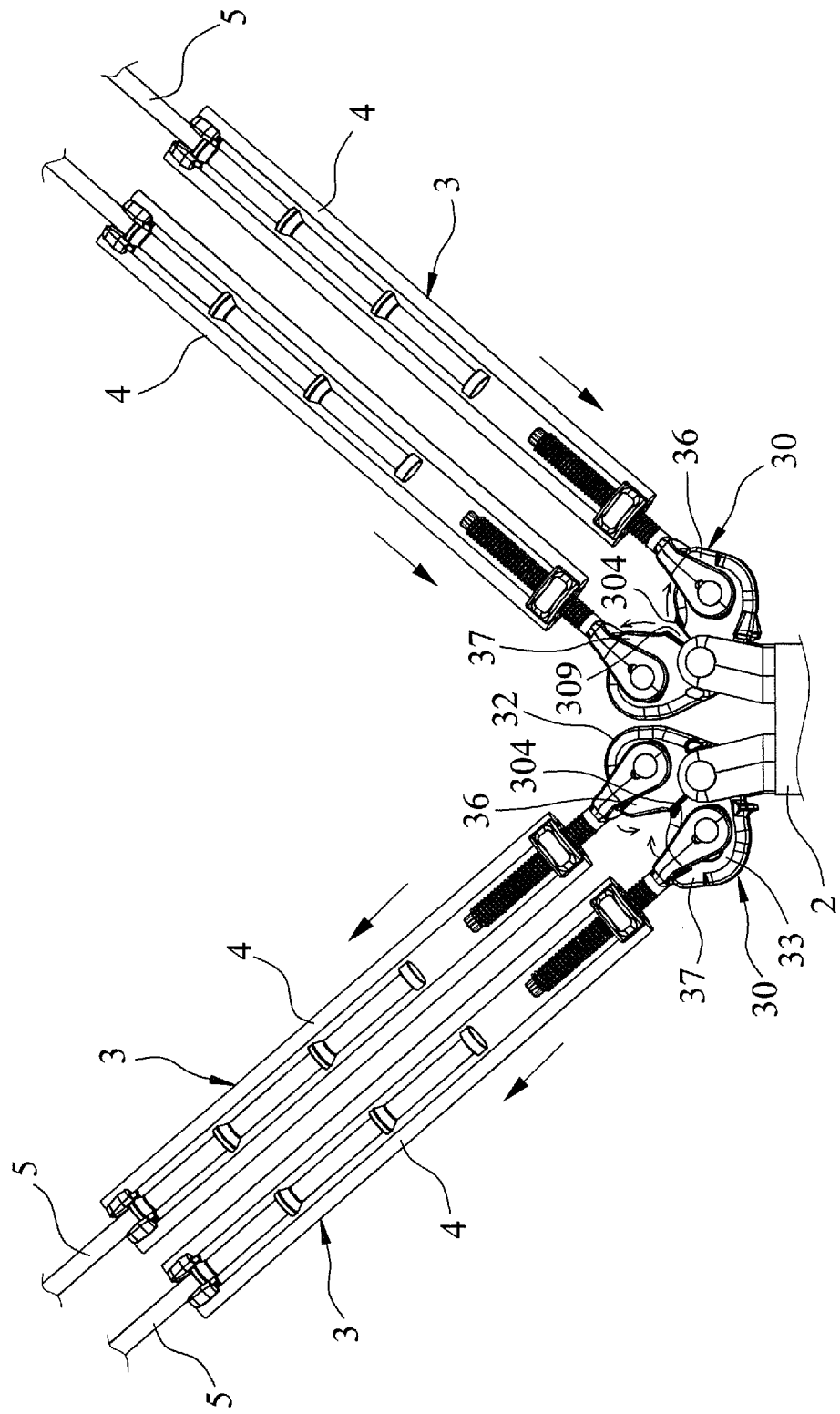
FIG. 11 is a schematic view illustrating states of the lashing eye assemblies and the lashing rod assemblies when the shipping containers are tilted.

The inner interconnecting surface 308 extends in a circumferential direction about the axle axis (A) to interconnect the inward regions 304 of the first and second wing members 32, 33, and is configured to permit the pin axle 25 to bear on the inner interconnecting surface 308 such that the inward regions 304 of the first and second wing members 32, 33 are spaced apart from each other by a gap 309, thereby permitting the first and second wing members 32, 33 to be yieldable in the circumferential direction to a jerking force exerted on the lashing eyes 302 of the first and second wing members 32, 33 through the lashing rod assemblies 3 as a result of a tilting movement of the shipping container 6 (see also FIGS. 9 to 11). In an embodiment, the inner interconnecting surface 308 is an arcuate surface.

Although the eye plate unit 30 is made from a rigid material, the eye plate unit 30 is constructed to permit the first and second wing members 32, 33 to be yieldable in response to the jerking force. Once the jerking force ceases, the eye plate unit 30 is permitted to return to its original shape.

In a process for mounting the mounting unit 10 on the platform 200, as shown in FIGS. 5 and 8, it only needs to ensure that (i) one of the flat surface regions 120 of the base 11 is disposed to flush with a first side surface 201 of the mounting post 2, and (ii) a third juncture line (L3) between the third minor surface 113 and the other one of the flat surface regions 120 to be coplanar with a second side surface 202 of the mounting post 2. By such arrangement, the eye plate unit 30 can be easily positioned to incline relative to the shipping containers 6 by a predetermined angle, which facilitate the pair of the lashing rod assemblies 3 to be arranged in a parallel manner (see FIG. 11).

When the ship is subjected to an impact to greatly shift in a rightward direction, the shipping containers 6 tend to tilt leftwardly as shown in FIG. 10. In this case, the lashing rod assemblies 3 on the right side of the tilted shipping containers 6 are pulled by the shipping containers 6 (see the left half of FIG. 11), and the inward regions 304 of the first and second wing members 32, 33 are moved toward each other, while the lashing rod assemblies 3 on the left side of the tilted shipping containers 6 are pushed by the shipping containers 6 (see the right half of FIG. 11), and the inward regions 304 of the first and second wing members 32, 33 are moved away from each other. As such, by virtue of the deformation of the eye plate unit 30, fracture of the shipping containers 6 or the lashing rod assemblies 3 is less likely to occur.

Figure 6:
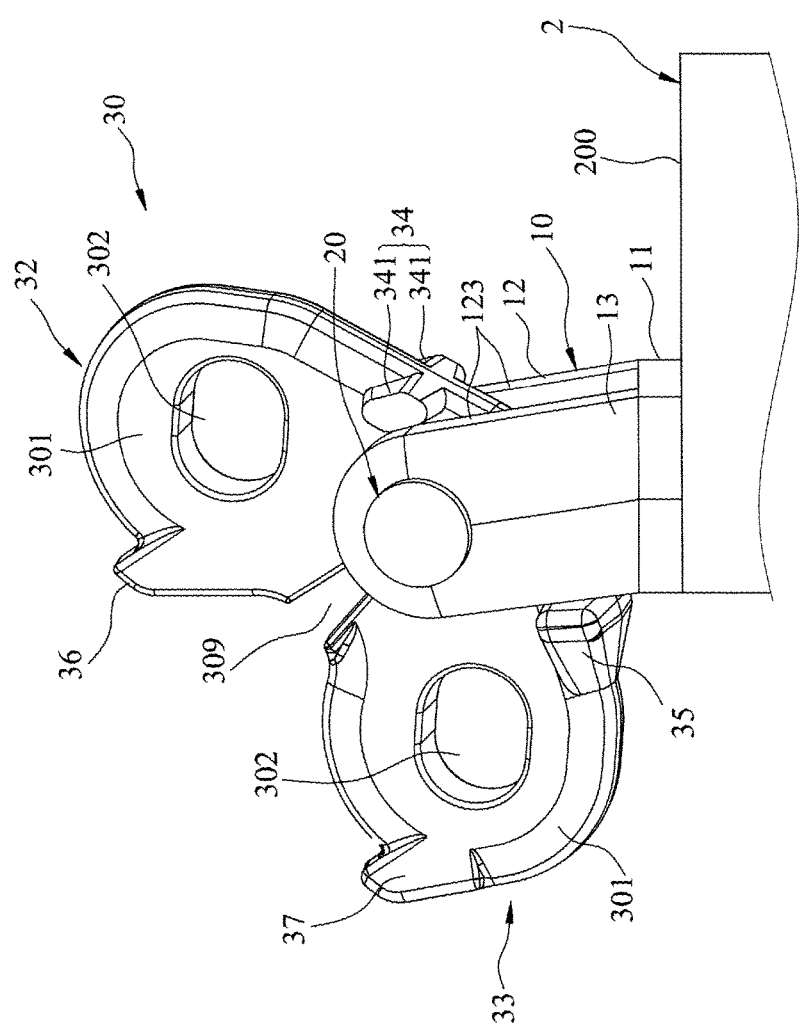
FIG. 6 is a perspective view of the lashing eye assembly of FIG. 5 in an assembled state.

As shown in FIGS. 5 and 6, the eye plate unit 30 further includes a first stop member 34 and a second stop member 35, each of which extends from the body portion 301 of a corresponding one of the first and second wing members 32, 33 adjacent to both the juncture region 306 and the outward region 305, and each of which is configured to be engageable with the first and second lug members 12, 13 so as to prevent further widening of the gap 309 due to the jerking force when an included angle between the inward regions 304 of the first and second wing members 32, 33 reaches a predetermined maximum value. In this embodiment, the first and second stop members 34, 35 are disposed proximate to and distal from the inner interconnecting surface 308, respectively.

In this embodiment, as best shown in FIG. 6, each of the first and second stop members 34, 35 has two stop segments 341 which extend oppositely from the body portion 301 of a corresponding one of the first and second wing members 32, 33 for engaging the lateral surfaces 123 of the first and second lug members 12, 13.

Figure 12:
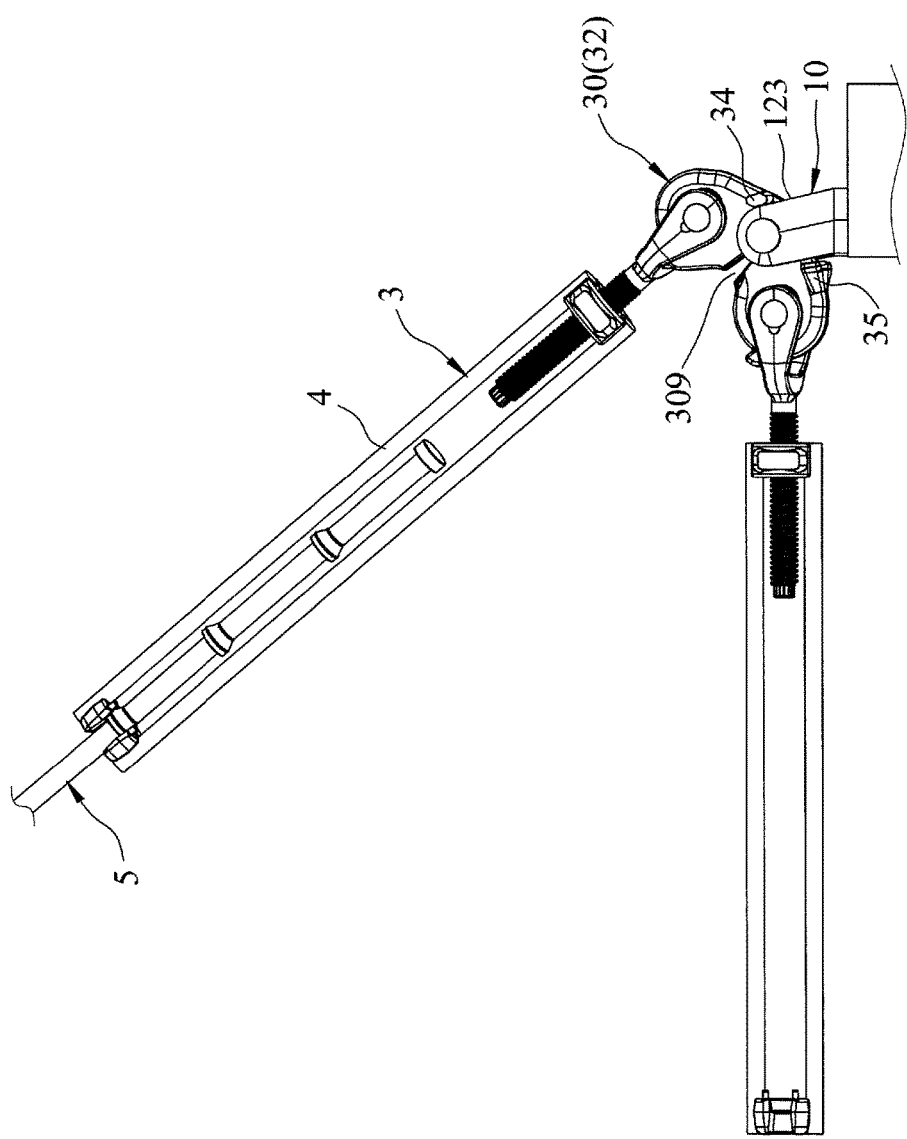
FIG. 12 is a schematic view illustrating that a single lashing rod is coupled to a pair of the turnbuckles.

Furthermore, as shown in FIG. 12, because the first and second stop members 34, 35 are provided to limit the width of the gap 309, the eye plate unit 30 can be used even if only a single lashing rod assembly 3 is used to secure the eye plate unit 30 to a shipping container 6.

Figure 13:
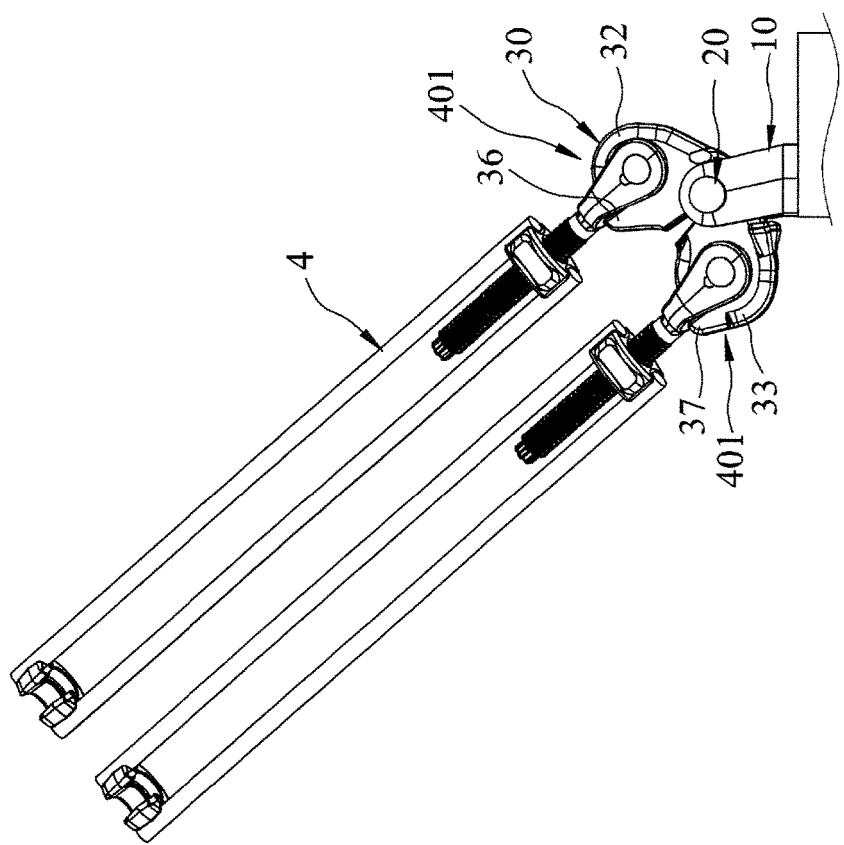
FIG. 13 is a schematic view illustrating that a first retaining member and a second retaining member are provided to keep the lower ends of the lashing rod assemblies spaced apart from each other by a distance.

As shown in FIGS. 5 and 13, the eye plate unit 30 further includes a first retaining member 36 and a second retaining member 37, each of which extends radially from the rim portion 303 of a corresponding one of the first and second wing members 32, 33, and each of which is disposed to be retainable with the lower end 401 of a corresponding one of the lashing rod assemblies 3 so as to keep the lower ends 401 of the lashing rod assemblies 3 spaced apart from each other by a distance within a predetermined range. In this embodiment, as best shown in FIG. 5, the first and second retaining members 36, 37 are disposed proximate to and distal from the inward regions 304 of the first and second wing members 32, 33, respectively.

Figure 14:
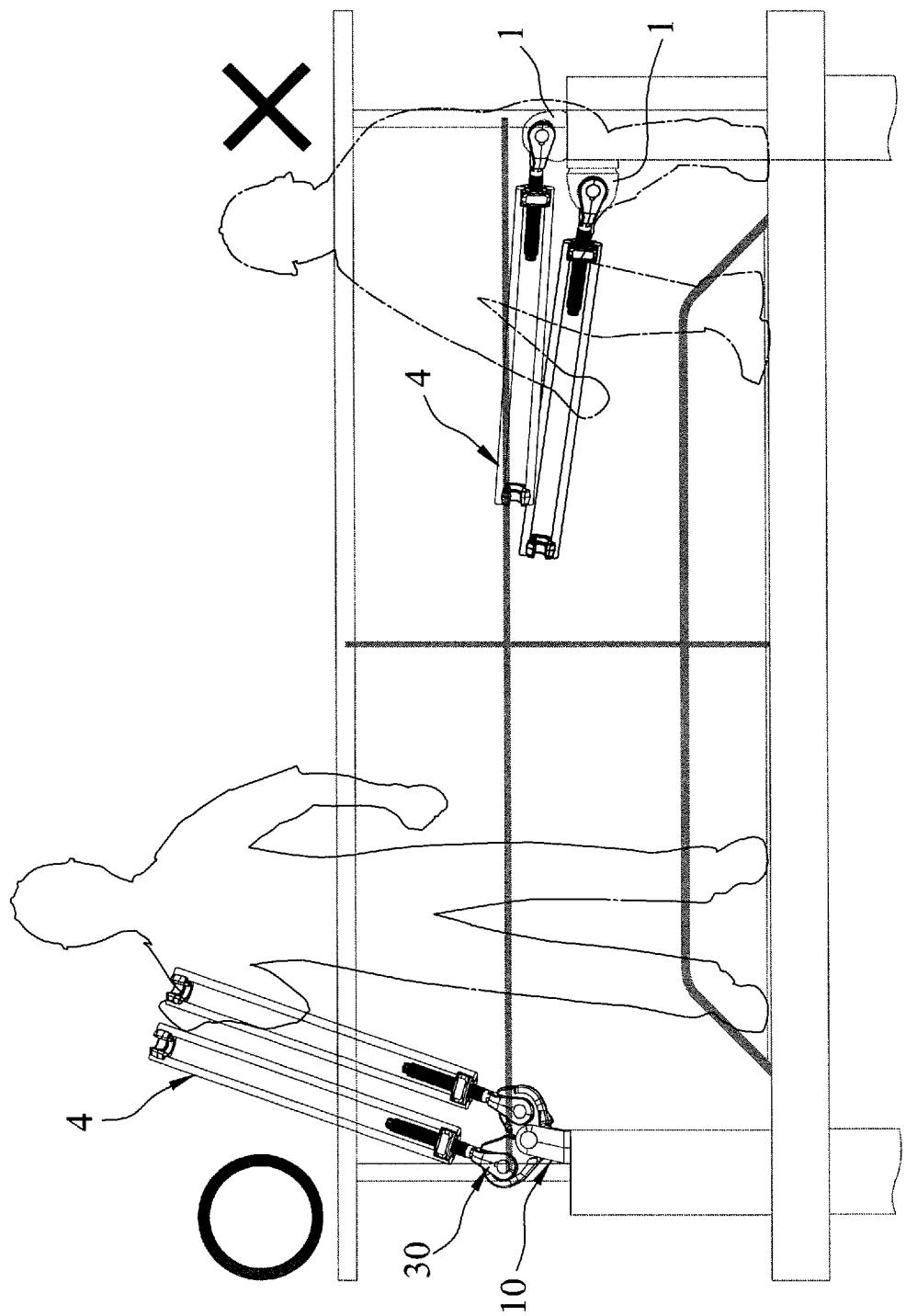
FIG. 14 is a schematic view illustrating that a pair of turnbuckles coupled to a lashing eye assembly of this disclosure may be held at an elevated position for easy operation.

Referring to FIGS. 13 and 14, it can be clearly noted that with the provision of the first and second retaining members 36, 37, a pair of the turnbuckles 4 can be easily kept in parallel so as to ease manual operation by a user (see the left half of FIG. 14). In contrast, as shown in the right half of FIG. 14, the user of the conventional eye plate 1 needs to struggle with the handling of a pair of the turnbuckles 4 secured on the conventional eye plates 1 due to twistability of the turnbuckles 4 relative to the conventional eye plates 1.

Figure 15:
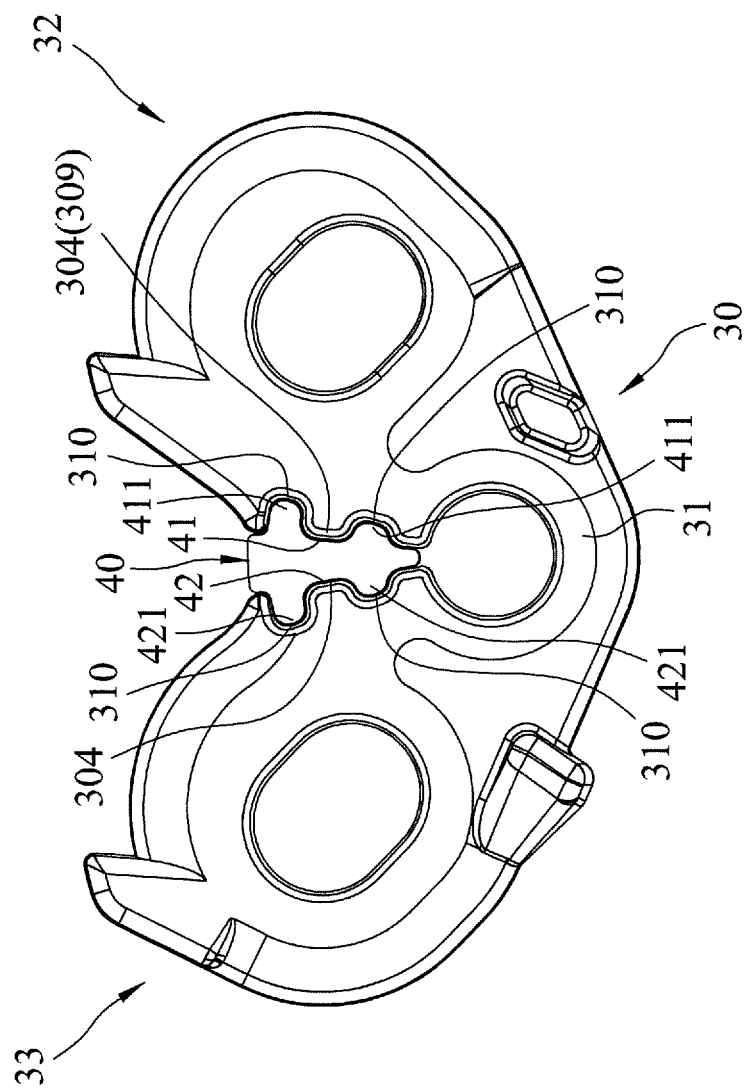
FIG. 15 is a plane view illustrating an eye plate unit of a lashing eye assembly according to a second embodiment of the disclosure.

FIG. 15 illustrates an eye plate unit 30 according to a second embodiment of the disclosure. The eye plate unit 30 in the second embodiment is similar to the eye plate unit 30 of the first embodiment, except that in the second embodiment, the eye plate unit 30 further includes an elastomeric spacer 40 which is disposed between the inward regions 304 of the first and second wing members 32, 33. The elastomeric spacer 40 may be made from any elastic material, such as a rubber material, and may provide a returning force for the first and second wing members 31, 32 so as to keep the gap 309 in a predetermined width.

In this embodiment, the elastomeric spacer 40 has two opposite surfaces 41, 42 which are positively locked with the inward regions 304 of the first and second wing members 32, 33, respectively.

In this embodiment, the opposite surfaces 41, 42 of the elastomeric spacer 40 are formed with a plurality of protrusions 411, 421, respectively, and the inward regions 304 of the first and second wing members 32, 33 are formed with a plurality of recesses 310 configured to permit the protrusions 411, 421 to be positively locked therewith.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An eye plate unit for anchoring a pair of lashing rod assemblies on a mounting unit, each of the lashing rod assemblies having an upper end coupled to a corner casting of a shipping container, and a lower end opposite to the upper end in a lengthwise direction of the respective lashing rod assembly, the mounting unit including
    a base mounted on a platform,
    a first lug member and a second lug member each of which extends from an upper major surface of the base, and each of which has an inside surface and an outside surface opposite to said inside surface in a direction of an axle axis, the inside surfaces of the first and second lug members being spaced apart from each other in the direction of the axle axis, and
    a pin axle extending along the axle axis, and interposed between the inside surfaces of the first and second lug members,
said eye plate unit comprising:
    a first wing member and a second wing member which are angularly displaced from each other about the axle axis, each of said first and second wing members having
        a body portion formed with a lashing eye which defines a central line, and which is configured to couple the lower end of a corresponding one of the lashing rod assemblies, and
        a rim portion extending about the central line, and having an inward region, an outward region, and a juncture region interconnecting said inward and outward regions; and
    a bridge member disposed between the first and second lug members, and extending to interconnect said juncture regions of said first and second wing members, said bridge member having
        an outer interconnecting surface interconnecting said outward regions of said first and second wing members, and
        an inner interconnecting surface which extends in a circumferential direction about the axle axis to interconnect said inward regions of said first and second wing members, and which is configured for the pin axle to bear on said inner interconnecting surface such that said inward regions of said first and second wing members are spaced apart from each other by a gap, thereby permitting said first and second wing members to be yieldable in the circumferential direction to a jerking force exerted on said lashing eyes of said first and second wing members through the lashing rod assemblies as a result of a tilting movement of the shipping container.

2. The lashing eye unit according to claim 1, further comprising a first stop member and a second stop member, each of which extends from said body portion of a corresponding one of said first and second wing members adjacent to both said juncture region and said outward region, and each of which is configured to be engageable with the first and second lug members so as to prevent further widening of said gap due to the jerking force when an included angle between said inward regions of said first and second wing members reaches a predetermined maximum value.

3. The lashing eye unit according to claim 1, further comprising a first retaining member and a second retaining member, each of which extends radially from said rim portion of a corresponding one of said first and second wing members, and each of which is disposed to be retainable with the lower end of a corresponding one of the lashing rod assemblies so as to keep the lower ends of the lashing rod assemblies spaced apart from each other by a distance within a predetermined range.

4. The lashing eye unit according to claim 1, further comprising an elastomeric spacer which is disposed between said inward regions of said first and second wing members.

5. The lashing eye unit according to claim 4, wherein said elastomeric spacer has two opposite surfaces which are positively locked with said inward regions of said first and second wing members, respectively.

6. The lashing eye unit according to claim 1, wherein each of said outer and inner interconnecting surfaces is an arcuate surface.

7. A lashing eye assembly for anchoring a pair of lashing rod assemblies on a platform, each of the lashing rod assemblies having an upper end coupled to a corner casting of a shipping container, and a lower end opposite to the upper end in a lengthwise direction of the respective lashing rod assembly, said lasing eye assembly comprising:

a mounting unit including
a base mounted on the platform,
a first lug member and a second lug member each of which extends from an upper major surface of said base, and each of which has an inside surface and an outside surface opposite to said inside surface in a direction of an axle axis, said inside surfaces of said first and second lug members being spaced apart from each other in the direction of the axle axis, and
a pin axle extending along the axle axis, and interposed between said inside surfaces of said first and second lug members; and an eye plate unit including
a first wing member and a second wing member which are angularly displaced from each other about the axle axis, each of said first and second wing members having
a body portion formed with a lashing eye which defines a central line, and which is configured to couple the lower end of a corresponding one of the lashing rod assemblies, and
a rim portion extending about the central line, and having an inward region, an outward region, and a juncture region interconnecting said inward and outward regions, and
a bridge member disposed between said first and second lug members, and extending to interconnect said juncture regions of said first and second wing members, said bridge member having
an outer interconnecting surface interconnecting said outward regions of said first and second wing members, and
an inner interconnecting surface which extends in a circumferential direction about the axle axis to interconnect said inward regions of said first and second wing members, and which is configured to permit said pin axle to bear on said inner interconnecting surface such that said inward regions of said first and second wing members are spaced apart from each other by a gap, thereby permitting said first and second wing members to be yieldable in the circumferential direction to a jerking force exerted on said lashing eyes of said first and second wing members through the lashing rod assemblies as a result of a tilting movement of the shipping container.

8. The lashing eye assembly according to claim 7, wherein a first included angle between said upper major surface of said base and said inside surface of said second lug member ranges from 75° to 80°, said upper major surface of said base and said inside surface define a first juncture line therebetween, and
said base has a first minor surface and a second minor surface which are opposite to each other in the direction of the axle axis, and which are disposed proximate to said first and second lug members, respectively, said second minor surface having two flat surface regions that form an obtuse angle, each of said flat surface regions defining a second juncture line together with said upper major surface of said base, a second included angle between said first and second juncture lines ranging from 10° to 15°.

9. The lashing eye assembly according to claim 7, wherein said eye plate unit further includes a first stop member and a second stop member, each of which extends from said body portion of a corresponding one of said first and second wing members adjacent to both said juncture region and said outward region, and each of which is configured to be engageable with said first and second lug members so as to prevent further widening of said gap due to the jerking force when an included angle between said inward regions of said first and second wing members reaches a predetermined maximum value.

10. The lashing eye assembly according to claim 7, wherein said eye plate unit further includes a first retaining member and a second retaining member, each of which extends radially from said rim portion of a corresponding one of said first and second wing members, and each of which is disposed to be retainable with the lower end of a corresponding one of the lashing rod assemblies so as to keep the lower ends of the lashing rod assemblies spaced apart from each other by a distance within a predetermined range.

11. The lashing eye assembly according to claim 7, wherein said eye plate unit further includes an elastomeric spacer which is disposed between said inward regions of said first and second wing members.

12. The lashing eye assembly according to claim 11, wherein said elastomeric spacer has two opposite surfaces which are positively locked with said inward regions of said first and second wing members, respectively.

13. The lashing eye assembly according to claim 7, wherein each of said first and second lug members has a lug hole extending from said outside surface to said inside surface, said mounting unit including
a tubular shaft having an enlarged head, a shaft end opposite to said enlarged head, and an intermediate segment which is disposed between said enlarged head and said shaft end, and which has two retained regions such that when said tubular shaft is inserted through said lug holes of said first and second lug members to leave said enlarged head and said shaft end outboard of said first and second lug members, said retained regions are respectively retained in said lug holes of said first and second lug members, so as to permit a remaining part of said intermediate segment between said retained regions to serve as said pin axle, and
a fastener secured to said shaft end so as to ensure said remaining part to be interposed between said first and second lug members.

* * * * *